United States Patent [19]

Barros et al.

[11] Patent Number: 4,834,456
[45] Date of Patent: May 30, 1989

[54] HEADREST ADJUSTING ARRANGEMENT, PARTICULARLY IN A MOTOR VEHICLE

[75] Inventors: Manuel Barros, Coburg; Hans Rampel, Ahorn; Emil Dinkel, Coburg; Josef Klink, Nagold; Ulrich Maier, Sindelfingen, all of Fed. Rep. of Germany

[73] Assignee: Brose Fahrzeugteile GmbH & Co., Fed. Rep. of Germany

[21] Appl. No.: 131,505

[22] Filed: Dec. 11, 1987

[30] Foreign Application Priority Data

Dec. 11, 1986 [DE] Fed. Rep. of Germany ....... 3642415

[51] Int. Cl.4 ............................................... A47C 1/10
[52] U.S. Cl. ..................................... 297/403; 297/408
[58] Field of Search .................. 297/403, 408; 74/427

[56] References Cited

U.S. PATENT DOCUMENTS

| | | | |
|---|---|---|---|
| 3,964,788 | 6/1976 | Kmetyko | 297/395 |
| 4,515,406 | 5/1985 | Fujiyama et al. | 297/391 |
| 4,615,230 | 10/1986 | Guichard | 74/427 |
| 4,693,515 | 9/1987 | Russo | 297/410 X |
| 4,711,494 | 12/1987 | Duvenkamp | 297/403 |

FOREIGN PATENT DOCUMENTS

| | | | |
|---|---|---|---|
| 3020558 | 12/1981 | Fed. Rep. of Germany | 297/403 |
| 3332728 | 3/1985 | Fed. Rep. of Germany | |
| 3600411 | 7/1987 | Fed. Rep. of Germany | |
| 2057135 | 5/1971 | France | |

Primary Examiner—James T. McCall
Attorney, Agent, or Firm—Barnes & Thornburg

[57] ABSTRACT

A rear headrest adjusting arrangement in a motor vehicle has a headrest pivot bearing unit that is fixed at the seat and at which two head pad holding devices are disposed that are spaced away from one another in the direction of the pivotal axis. A pivot bearing shaft is provided that has two connecting parts for the holding devices, the connecting parts being spaced away from one another and being connected with the pivot bearing shaft in a torsionally fixed way. A driving motor is provided adjacent to the pivot bearing shaft, the driving motor having a motor shaft that with respect to its axis is parallel to the pivot bearing shaft and having a gearbox that connects the motor shaft with the pivot bearing shaft. This provides the possibility of a motor-driven headrest adjusting arrangement with little installation space for the pivot bearing unit.

9 Claims, 4 Drawing Sheets

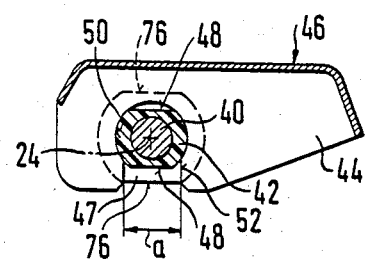
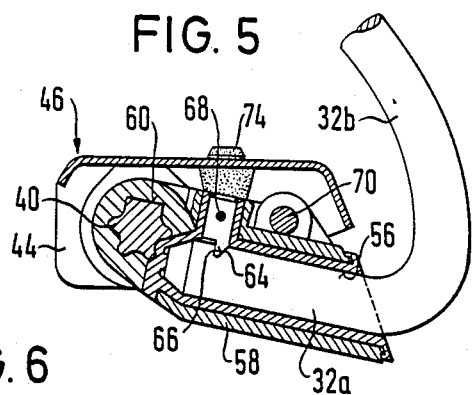
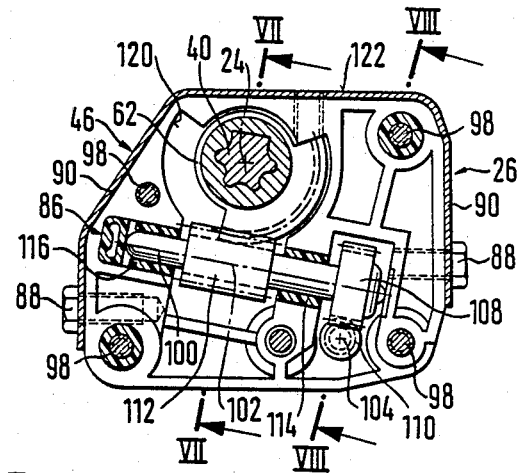
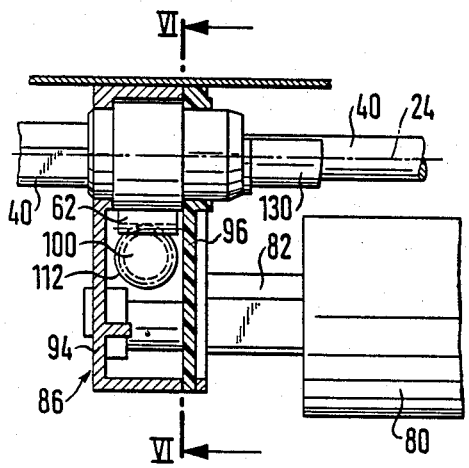
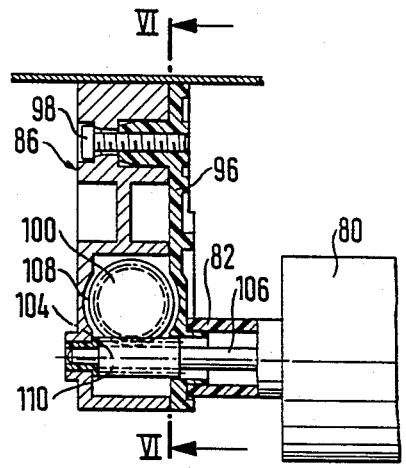

HEADREST ADJUSTING ARRANGEMENT, PARTICULARLY IN A MOTOR VEHICLE

BACKGROUND AND SUMMARY OF INVENTION

The invention relates to a headrest adjusting arrangement, particularly of a rear headrest in a motor vehicle, having a headrest pivot bearing unit that is fixed at the seat. At this headrest pivot bearing unit, two head pad holding devices are disposed that are spaced away from one another in the direction of the pivotal axis.

Rear headrests represent an important accident protection for the passengers in the rear seats. However, when the rear seats are unoccupied, the rear headrests represent an impairment of the driver's view toward the rear that in principle can be avoided. Both aspects are taken into account by the rear headrest adjusting arrangement of this type. Up to now, this headrest adjusting arrangement was operated manually. The disadvantage in this case is that for reasons of convenience, the headrest is often not swivelled into the correct position.

It is an objective of the invention to provide a motor-operable rear headrest arrangement of a simple construction in which the driving unit requires only little installation space.

This objective is achieved according to preferred embodiments of the invention by the fact that a pivot bearing shaft is provided having two connecting parts for the holding devices spaced away from another and connected with the pivot bearing shaft in a torsionally fixed way, that adjacent to the pivot bearing shaft, a driving motor is provided having a motor shaft that is parallel with respect to its axis to the pivot bearing shaft, and that a gearbox is provided that connects the motor shaft with the pivot bearing shaft.

According to the invention, the driving motor, together with the gearbox, finds space between the two connecting parts for the holding hoops. The driving motor that is oblong in the direction of its motor shaft extends in parallel with respect to the axis next to the pivot bearing shaft so that the cross-sectional dimensions of the required installation space in a plane that is vertical or perpendicular with respect to the pivot bearing shaft axis are comparatively small. The whole pivot bearing unit with the pivot bearing shaft, the driving motor and the gearbox therefore easily find room in the possibly toroidally elevated area of the rear window shelf between its front edge and the head pad receiving trough that at least partially receives the head pad in its inoperative position. Without any special measures, the motor-driven rear headrest adjustment arrangement can therefore be installed instead of the manual rear headrest adjusting arrangement, or, if necessary, may be exchanged subsequently for the latter. The preferably one-piece gear shaft drives both holding hoops simultaneously. The mechanical construction is therefore reliable with respect to its operation.

In a preferred further development of the invention, it is provided that the gearbox comprises a gear shaft having a worm segment into which a motor worm engages that, in a torsionally fixed way, is connected with the motor shaft, and having a worm segment which engages in a worm wheel element that, in a torsionally fixed way, is connected with the pivot bearing shaft. Thus, the driving motor is connected with the pivot bearing shaft via two individual worm wheel gears with the advantage of a correspondingly high step-down ratio which permits the use of a cost-effective fast-running driving motor of small dimensions and low weight.

In a particularly preferred manner, the worm wheel element is developed in a sector shape. The required pivoting angle for the headrest adjustment that in general is below 180° permits the reduction of the worm wheel element to a sector-shaped worm wheel element. Particularly advantageous is the resulting further reduction of the required installation space.

It is also suggested according to certain preferred embodiments that the pivot bearing shaft have a non-circular cross-section, preferably without rotational symmetry. This facilitates the assembly and, if necessary, the disassembly of the pivot bearing unit for purposes of repair because the connecting parts as well as the worm wheel element that are provided with a passage opening corresponding to the cross-section of the pivot bearing shaft, must only be pushed onto the pivot bearing shaft. When a square shaft with a rotational symmetry of 90° is used, for example, the possibility exists in principle that the elements to be pushed on may be pushed onto the shaft in correspondingly four different rotating positions. In order to exclude this during the mounting, it is suggested in certain preferred embodiments that the pivot bearing shaft have a cross-section without rotational symmetry. Particularly preferred is a pivot bearing shaft in the shape of a star shaped cross-section. A one-sided flattening of this star shaped cross-section will eliminate the rotational symmetry.

In a further development of certain preferred embodiments of the invention, it is suggested that the pivot bearing shaft, at least at one end, is pivotally disposed in a bearing bush which, in turn, is inserted into a bearing opening of a bearing plate, in which case the bearing plate has a bearing bush insertion opening that leads into the bearing opening in a direction that is essentially perpendicular with respect to the pivot shaft axis. These measures permit an easy assembly, and, if necessary, disassembly of the pivot bearing shaft. In this case, it is preferably provided that the bearing bush has a circular section that is adapted to the circular bearing opening and has flattened areas that are opposite one another, in which case, the distance of the flattened areas from one another corresponds essentially to the width of the insertion opening. The mounting therefore takes place by rotating the bearing bush by about 90° after the insertion through the insertion opening into the bearing opening.

It is suggested in certain preferred embodiments that a pivot bearing housing be provided, essentially in the shape of a hoop that is oblong in the direction of the pivot bearing shaft. The ends of this hoop are bent in the same direction for forming the bearing plates. In this case, it may be provided that the hoop is equipped with at least one laterally projecting fastening tab for the gear carrying the driving motor. The pivot bearing housing that is formed in this way may be formed by a corresponding sheet metal stamping which has compact dimensions, mechanically is sufficiently stable and requires low manufacturing costs.

Other objects, advantages and novel features of the present invention will become apparent from the following detailed description of the invention when considered in conjunction with the accompanying drawings.

BRIEF DESCRIPTION OF THE DRAWINGS

FIG. 4 is a sectional detail view taken along Line IV—IV in FIG. 2;

FIG. 5 is a sectional detail view taken along Line V—V in FIG. 2;

FIG. 6 is a sectional detail view taken along Line VI—VI in FIGS. 2, 7 and 8;

FIG. 7 is a sectional view taken along Line VII—VII in FIG. 6; and

FIG. 8 is a sectional view taken along Line VIII—VIII in FIG. 6.

DETAILED DESCRIPTION OF THE DRAWINGS

Figure 1:
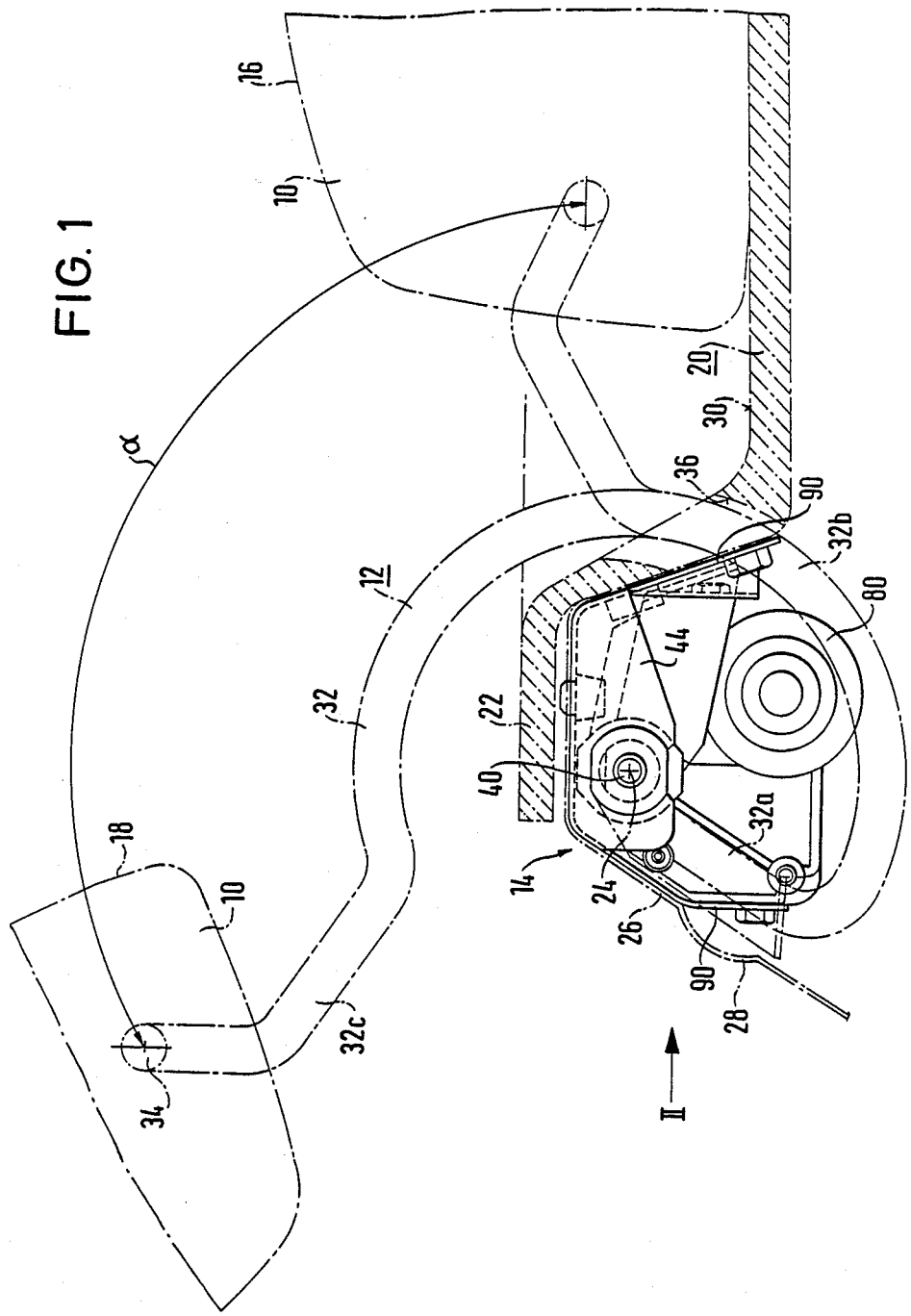
FIG. 1 is a diagrammatic lateral view of an embodiment of a vehicle rear headrest adjusting arrangement constructed according to a preferred embodiment of the invention.
Figure 2:
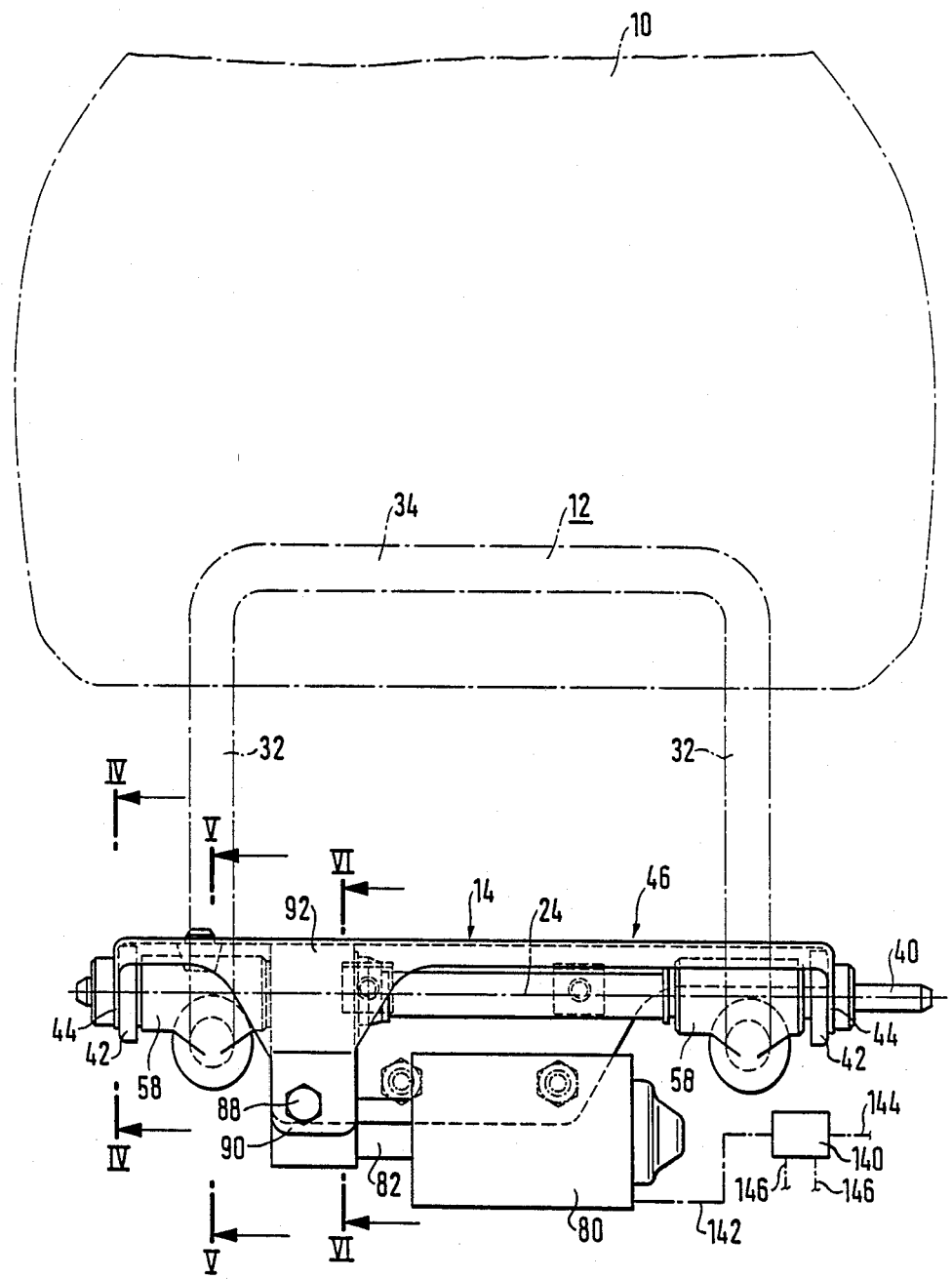
FIG. 2 is a front view of the headrest adjusting arrangement according to FIG. 1 taken in the viewing direction of Arrow II.

The diagrammatic representation of FIGS. 1 and 2 shows a head pad 10 (outlined by a dash-dotted line) which is connected via a U-shaped hoop 12 with a headrest pivot bearing unit that as a whole has the reference number 14, for a motor-driven movement between an inoperative position 16 shown in FIG. 1 on the right and a head-supporting position 18. In the inoperative position 16, the head pad is essentially outside the rear view mirror viewing range of the vehicle driver. For this purpose, it is at least partially received by a head pad receiving trough 20 in a rear window shelf plate 22. The pivoting shaft 24 of the pivot bearing unit 14 extends in the horizontal direction transversely to the driving direction in a trapezoidal-roof-like arching-out section 26 of a body panel 28 on which the plate 22 rests. The shaft 24, according to FIG. 1, is arranged in the area of the front edge of the rear window shelf plate 22 and is located higher than the bottom 30 of the trough 20. The two lateral legs of the hoop 12, in each case, form a holding device 32 for the head pad 10. According to FIG. 1, each holding device, originating from the shaft 24, extends first radially (section 32a), then along a graduated-circle arc at about 240° (section 32b) and finally along a once-buckled section 32c into the inside of the pad 10 to the center leg 34 of the U-shape of the loop 12 according to FIG. 2. Because of this loop shape, only a relatively small passage opening 36 has to be provided in the plate 22 and in the body panel 28.

The construction of the pivot bearing unit 14 is shown in the figures. A continuous pivot bearing shaft 40, is disposed at a bearing plate 44 in the form of a bending-away of a pivot bearing housing 46 in the form of a sheet-metal stamping with the ends borne in respective bearing sleeves. Each bearing bush 42 is provided with a circumferential groove 47, the width of which corresponds to the sheet thickness of the bearing plate 44. The cross-section of the bearing bush in the area of this groove 47 is shown in FIG. 4. It is recognizable that the cross-section is circular with flattened areas 48 that are opposite one another. The diameter is adapted to the corresponding diameter of a bearing opening 50 of the bearing plate 44. Correspondingly, the distance between both flattened areas 48 is fixed corresponding to the width a of an insertion opening 52 leading into the bearing opening 50. For the mounting of the shaft 40 at the housing 46, therefore, both bearing bushings 42 are first pushed onto the corresponding shaft ends and then the shaft in FIG. 4 is moved toward the housing 46 from below with bearing bushes that are rotated by 90° with respect to FIG. 4. In this position, both bearing bushes 42, through the insertion openings 52, can be pushed into the circular bearing openings 50. Subsequently, both bearing bushes 42 are rotated by 90° into the position shown in FIG. 4 and in this way are fixed in the respective bearing opening. The bearing bush 42 that preferably consists of plastic, in this case, may be disposed in the bearing opening in such a way that special measures for a fixing of the rotating position of the bearing bush in the bearing opening are not necessary.

Figure 3:
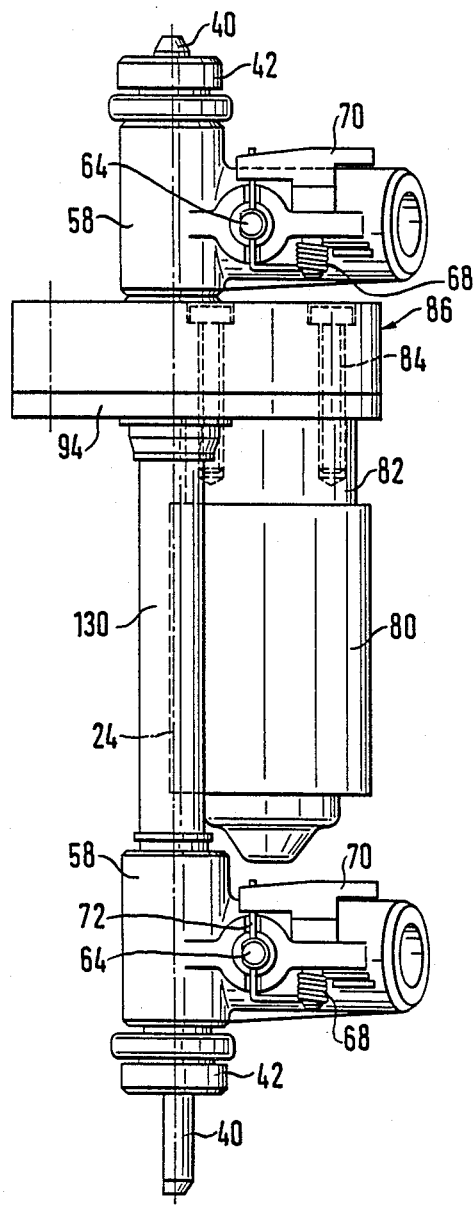
FIG. 3 is a top view of the pivot bearing unit of the headrest adjusting arrangement according to FIGS. 1 and 2 with the pivot bearing housing removed for clarity.

As shown in detail in FIG. 5, each of the straight sections 32a of the two holding devices 32 is inserted into an insertion opening 56 of a connecting part 58 which, in turn, in a torsionally fixed way, is connected with the shaft 40. For this purpose, the shaft 40, at least in the area of its respective connecting part 58, is developed with a non-circular rotationally asymmetrical cross-section, in the shown case, in the shape of a star with a flattened area 60 on one side. This flattened area 60 provides that the two connecting pieces 58 as well as a worm element 62, that will be explained in detail below in conjunction with FIG. 6, can be pushed onto the shaft 40 only in a predetermined mutual orientation. A stop pin 64, shown in FIGS. 3 and 5, engages in a corresponding stop notch 66 of the section 32a in order to secure it in the respective connecting part 58. One respective pretensioning spring clip 68, shown in FIGS. 3 and 5, prestresses the stop pin 64 that can be shifted in the connecting part 58, into its engaging position. A release lever 70, shown in FIGS. 3 and 5, permits a release of the locking. For this purpose, it is applied to a section 72 of the spring 68 that transversely penetrates the pin 64.

FIG. 5 also shows a damping stop 74 that is fastened at the housing 46 and against which the connecting part 58 strikes in the head-supporting position 18 of the head pad 10. With respect to the two bearing bushes 42, it should be pointed out that these, at their end located outside the housing 46, are again provided with two flattened areas 76 that are opposite one another for the application of a corresponding tool, such as a wrench.

The pivot bearing unit 14 is driven by a driving motor 80, particularly an electric motor. This electric motor, via a connecting piece 82, is connected with a gearbox 86 by means of screws 84 depicted in FIG. 3. This gearbox 86, in turn, by means of cap screws 88, is fastened at fastening tabs 90 of the housing 46. The fastening tabs 90 project at sides of the longitudinal loop-shaped section 92 of the housing 26 that are opposite one another, the two ends of said housing being bent away for forming the bearing plates 44 according to FIG. 2.

The construction of the gearbox 86 is shown in FIGS. 6 to 8. It has a gear housing 94 with a housing cover 96 and cap screws 98 that connect both parts. In the gear housing 94, a gear shaft 100 is rotationally disposed, in which case the axis 102 is located in a plane that is perpendicular with respect to the axis 24. The axis 104 of a motor shaft 106 of the driving motor 80 extends in parallel to the axis 24.

The gear shaft 100 connects the motor shaft 106 directly with the pivot bearing shaft 40. For this purpose, the gear shaft 100 is provided with a worm wheel segment 108, that mates with a motor worm 110 developed at the motor shaft 106. The gear shaft 100 is also developed with a worm segment 112 which mates with the above-mentioned sector-shaped worm wheel element 62. The gear 86 therefore represents a two-step worm gear with a step-down ratio of, for example, i=110.

The gear shaft 100 is rotationally supported between the worm wheel segment 108 at one of its two ends and the worm segment 112 in a first pivot bearing 114, and on the other side of the worm segment 112, in a second pivot bearing 116. Both pivot bearings 114 and 116, as plastic parts, may be developed in one piece with the cover 96 of the gear 86.

Corresponding to the required pivot angle of the head pad 10 between its two positions 16 and 18 in FIG. 1 (pivot angle about 120°), the sector angle of the worm wheel element 62 is fixed at about 130°, which results in a sector angle of about 250° for a corresponding sector-shaped recess 120 inside the housing 94. The recess 120 is oriented in such a way that the sector of the worm wheel element 62 moves mainly in an area below the axis 24 so that the top side 122 of the housing can be disposed correspondingly close to the axis 24. As shown particularly in FIGS. 4 and 6, an extremely compact structural shape is obtained in which the axes 104 and 24 of the motor shaft 106 and of the pivot bearing shaft 40 are located close to one another.

In the area between the gearbox 94 and the farther connection piece 58 (in FIG. 3, on the bottom), the pivot bearing shaft 40 is guided in a protective sleeve 130.

The above-described rear headrest adjusting arrangement distinguishes itself mainly because of the fact that the adjustment of the headrest takes places by means of a motor. In this case, only little installation space is required for the pivot bearing unit 14, so that the installation of the motor-driven rear headrest adjusting arrangement according to the invention is possible without changing the body in vehicles that are prepared for a manual rear headrest adjusting arrangement. A subsequent converting from a manual rear headrest adjusting arrangement to the structural shape according to the invention is also possible. Advantageously, the manufacturing and mounting costs are low. The high step-down ratio permits the use of a compact, light, fast-running electric motor.

The control of the electric motor 80 may take place manually or automatically. As outlined in FIG. 2, for this purpose, a control unit 140 by means of a control line 142 is connected with the driving motor 80. The control unit 140, via a line 144, is connected with a manual switch that is not shown. Additional lines 146 connect the control unit 140 with the seat contacts that are not shown. As soon as one of the two rear seats is occupied, a signal, via the corresponding line 146, is supplied to the control unit 140 which then, via the line 142, causes the driving motor 80 to swivel the pad 10 into the head supporting position 18 according to FIG. 1. As soon as the seat becomes vacant again, the control unit 140 causes a swivelling-back of the head pad 10 into the inoperative position 16. By means of corresponding end contacts that are not shown, it can be ensured that the driving motor 80 will not be switched off before the respecitve position 16 or 18 of the head rest 10 is reached.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A headrest adjusting arrangement, particularly of a rear headrest in a motor vehicle, having a headrest pivot bearing unit that is fixed at the seat and two head pad holding devices disposed at said headrest pivot bearing unit that are spaced away from one another in the direction of the pivotal axis, wherein a pivot bearing shaft is provided having two connecting parts for the holding devices that are spaced from one another and, in a torsionally fixed way, are connected with the pivot bearing shaft, wherein adjacent to said pivot bearing shaft, a driving motor is provided having a motor shaft that with respect to its axis is parallel to the pivot bearing shaft, and wherein a gearbox transmission is provided that connects the motor shaft with the pivot bearing shaft, and wherein the gearbox transmission includes:
a motor worm connected to and rotatable with the motor shaft,
a worm wheel element connected to and rotatable with the pivot bearing shaft,
and a connecting gear shaft which has a first worm segment drivingly engaged with the motor worm and a second worm segment drivingly engaged with the worm wheel element.

2. A rear headrest adjusting arrangement according to claim 1, wherein the worm wheel element is developed in the shape of a sector.

3. A rear headrest adjusting arrangement according to claim 1, wherein the pivot bearing shaft has a non-circular cross-section, preferably without rotational symmetry.

4. A rear headrest adjusting arrangement according to claim 3, wherein the pivot bearing shaft exhibits a star-shaped cross-section with a flattening on one side.

5. A headrest adjusting arrangement, particularly of a rear headrest in a motor vehicle, having a headrest pivot bearing unit that is fixed at the seat and two head pad holding devices disposed at said headrest pivot bearing unit that are spaced away from one another in the direction of the pivotal axis, wherein a pivot bearing shaft is provided having two connecting parts for the holding devices that are spaced from one another and, in a torsionally fixed way, are connected with the pivot bearing shaft, wherein adjacent to said pivot bearing shaft, a driving motor is provided having a motor shaft that with respect to its axis is parallel to the pivot bearing shaft, and wherein a gearbox transmission is provided that connects the motor shaft with the pivot bearing shaft, and wherein the pivot bearing shaft, at least on one end, is pivotally disposed in a bearing bush, that, in turn, is inserted into a bearing opening of a bearing plate, said bearing plate having a bearing bush insertion opening that leads into the bearing opening in a direction that is essentially perpendicular with respect to the pivot shaft axis.

6. A rear headrest adjusting arrangement according to claim 5, wherein the bearing bush has a circular section that is adapted to the circular bearing opening and has flattened areas that are opposite one another, the distance of said flattened areas from one another corresponding essentially to the width of the insertion opening.

7. A rear headrest adjusting arrangement according to claim 5, wherein a pivot bearing housing is provided essentially in the shape of a hoop that is oblong in the direction of the pivot bearing shaft and the ends of which are bent in the same direction for forming the bearing plates.

8. A rear headrest adjusting arrangement according to claim 7, wherein the hoop is provided with at least one laterally projecting fastening tab for the gearbox carrying the driving motor.

9. A rear headrest adjusting arrangement according to claim 6, wherein a pivot bearing housing is provided essentially in the shape of a hoop that is oblong in the direction of the pivot bearing shaft and the ends of which are bent in the same direction for forming the bearing plates.

* * * * *